Aug. 8, 1967　　　V. A. SAKHARNOV, ET AL　　　3,335,257
DEVICE FOR ADJUSTING ITEMS' MELTING SPEED
IN BUTT WELDING MACHINE
Filed May 12, 1964　　　　　　　　　　　　2 Sheets-Sheet 2

United States Patent Office 3,335,257
Patented Aug. 8, 1967

3,335,257
DEVICE FOR ADJUSTING ITEMS' MELTING SPEED IN BUTT WELDING MACHINE
Vasily Alexeevich Sakharnov, Sergei Ivanovich Kuchuk-Jatsenko, Evgeny Ivanovich Shinlov, and Mikhail Petrovich Khudjakov, all of Kiev, U.S.S.R., assignors to Institute Elektrosvarki E. O. Paton, Kiev, U.S.S.R.
Filed May 12, 1964, Ser. No. 366,844
3 Claims. (Cl. 219—101)

The present invention relates to means for adjusting the speed of feeding welded articles in butt welding by flashing. Prior to our invention, there existed assemblages for adjusting the melting speed in butt welding machines which incorporated a slide valve controlling the hydraulic drive means, means for feeding items for melting and upsetting, and an adjustable electric drive means provided with a screw gear arrangement for moving the stem of the slide valve.

The drawback of the existing assemblages is the insufficient stability of the welding process by continuous melting, complicated design and the difficulty of accomplishing the welding process in accordance with a present program.

An object of the present invention is to ensure the stability of the welding process by continuous melting.

Another object of the invention is to simplify the structural details of the adjusting means and to provide favorable conditions for welding in accordance with a preset program.

Figure 1:
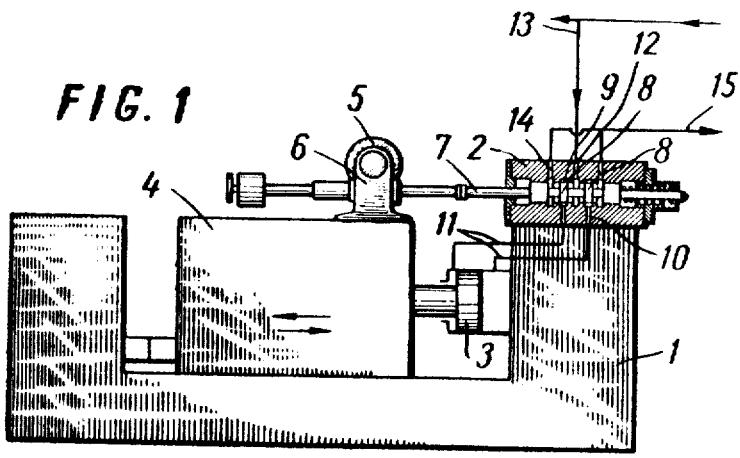
Figure 4:
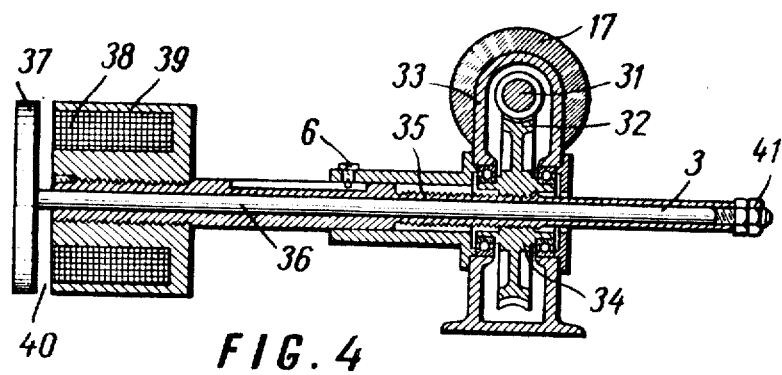
Figure 3:
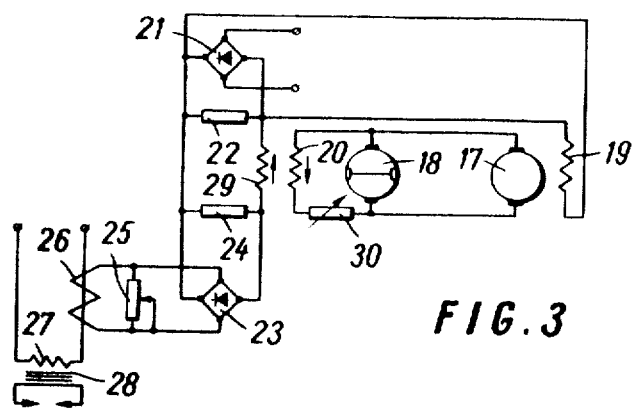
Figure 2:
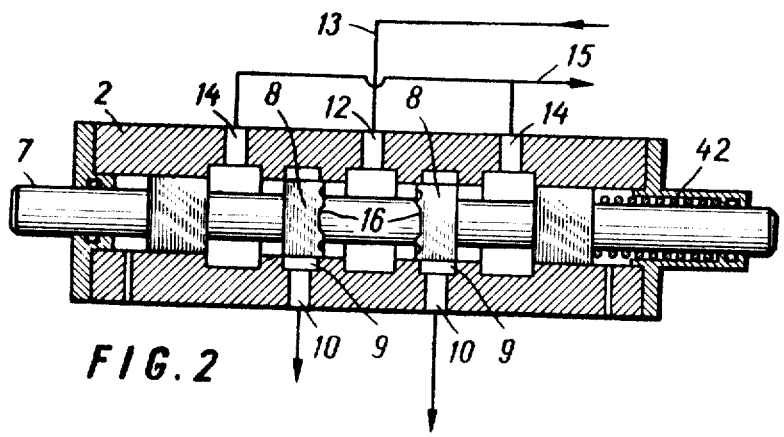

Additional objects and advantages of the invention will become more readily apparent to persons skilled in the art from the following detailed description and annexed drawings, and in which drawings:

FIG. 1 is an elevational view partly in cross-section of an embodiment of the invention including means for adjusting the speed of feeding welded articles in butt welding by flashing, FIG. 2 is a view partly in longitudinal cross-section and elevation of the control slide valve assemblage, FIG. 3 is a diagrammatic view of the circuitry for the movement of the stem for the slide valve assemblage, and FIG. 4 is a view partly in longitudinal cross-section and elevation of the means for moving the stem of the slide valve assemblage.

Installed on a fixed part 1 of the welding machine frame (FIG. 1) is a slide valve assemblage 2, for controlling the fluid supply into hydraulic cylinders 3 of a hydraulic drive unit of melting and upsetting. An adjustable electric drive 5 provided with a screw gear 6 for controlling the movement of a slide valve stem 7 is operably related to the movable part 4.

Collars or enlargements 8 on the slide valve stem 7 (FIGS. 1 and 2) function to close casing grooves 9 of the valve casing and which grooves through holes 10 and pipelines 11 communicate with the hydraulic cylinder 3. The slide valve casing is formed with a hole or part 12 which is connected with the hydraulic system high-pressure line through a pipeline 13, and via holes or ports 14 with a drain pipeline 15. The collars 8 are formed with recesses 16 which serve for decreasing the working fluid flow at the opening of the moment of the slide valve 2.

Adjustable electric drive 5 comprises a low-power D.C. electric motor 17 (FIG. 3), the supply circuit of which employs a welding supply negative voltage feedback. The motor 17 is supplied from generator 18, and field winding 19 thereof is connected to an independent D.C. source. Field winding 20 of the generator is a control winding and is connected in the comparator of a master voltage supplied from a rectifier 21 to a resistor 22 and the control voltage supplied from a rectifier 23 to a resistor 24. The rectifier 21 is supplied from an independent electric power source and supply voltage to the rectifier 23 is fed from an adjustable resistor 25 connected in the circuit of a secondary winding 26 of the transformer which is connected in the circuit of a field winding 27 of a welding transformer 28.

The rectifiers 21 and 23 are oppositely connected and field winding 29 of the generator 18 is stabilizing and is connected in parallel with the armature of the generator 18 through an adjustable resistor 30.

The electric motor 17 drives a worm shaft 31 and associated worm gear 32 of a reduction gear assembly 33 (FIG. 4). The worm gear 32 is provided with a hub 34 which is threaded and serves as a nut for a screw 35 of the screw gear. A rod 36 connected to a movable yoke 37 of an electromagnet 38 passes through the interior of the screw. A casing 39 of the electromagnet is connected with the screw 35. The clearance between the movable yoke and the electromagnet casing denoted generally 40 may be adjusted by the manipulation nuts 41 installed on the rod 36.

With the electric motor 17 operating, the screw 35 moves in an axial direction and through the rod 36 with the nuts 41 acts on the stem 7 moving the stem relative to the casing of the slide valve 2.

The present invention operates as follows:

With voltage supplied to the rectifier 21 and with the generator 18 rotating, the electric motor 17 is supplied from the generator and drives the worm shaft 31 and worm gear 32 thereby resulting in an axial movement of the screw 35 together with the rod 36. Also, the valve stem 7 pressed by a spring 42 to the rod 36 will move in an axial direction. Depending on the direction of movement of the stem 7 relative to the casing of the slide valve, the collars 8 will move with respect to the grooves 9 so that the pipeline 13 of the hydraulic system high pressure line will through the hole 12, grooves 9, one of the holes 10 and the pipeline 11 communicate with one chamber of hydraulic cylinder 3. Simultaneously, the other chamber of the hydraulic cylinder 3 will communicate with the drain pipeline 15. The frame movable part 4 connected with the piston of the hydraulic cylinder 3 starts moving, and the movement will continue until the screw 35 with the rod 36 ceases this movement. As a result of the cessation of the axial movement of the screw 35, slide valve stem 7 is moved by the spring 42 relative to the casing, and the collars 8 close the grooves 9, thus cutting off the hydraulic fluid supply into the hydraulic cylinder 3.

The speed and direction of movement of the screw 35 which determines that of the movement of the movable part 4, depend on the speed and the direction of rotation of the electric motor 17 and on the value and the polarity of voltage of generator 18. In turn, the voltage of the generator is determined by the power supply conditions of the field winding 20. With no welding current supplied and at such values of the current that the voltage of the rectifier 23 is lower than that of the rectifier 21, the current of the field winding 20 and, consequently, the voltage of the generator 18 remain constant and are determined by the value of voltage of the rectifier 21. After the voltage of the rectifier 23 exceeds the voltage of the rectifier 21. After the voltage of the rectifier 23 exceeds the voltage of the rectifier 21 as a result of an increase in the welding current, the current in the field winding 20 and the voltage of the generator 18 will change in accordance with a change in the welding current. With an increase in the current, the generator voltage will decrease and with a decrease in the current, the generator voltage will increase. This results in changing the speed of rotation of the electric motor 17, the speed of movement of the screw 35 together with the rod 36, and the speed of movement of the movable part 4. Thus, the speed of feeding the items for melting is set depending on the welding current at the values of the latter exceeding the preset values. This is achieved by employing the welding supply negative voltage feedback of the electric drive supply system.

During upsetting, the electromagnet 38 is energized, and the yoke 37 is drawn to the casing 39. The rod 36 moves axially to the right and moves the slide valve stem by the value of the clearance between the yoke 37 and the electromagnet casing 39. The slide valve permits access for a large quantity of fluid into the hydraulic cylinder 3 which ensures the high speed movement of the frame movable part 4.

To increase the response of the hydraulic drive to commands for changing the speed of movement of the frame movable part, provided on collars 8 of the slide valve stem are recesses 16 used for reducing the fluid flow at the moment of the slide valve opening.

The present invention provides a steady process of continuous melting during butt welding at a low power of the welding machine. The welding method by means of continuous melting permits, as compared with the welding method by interrupted heating, a considerable reduction of the consumption of electric power during welding and, consequently, the use of low-power welding machines, when welding items having a relatively large cross-section. This also permits a successful application of a welding process having a program control for the welding machine main parameters.

A high response to the commands sent, when carrying out the preset welding program is provided by the power supply system of the electric drive controlling the hydraulic drive for the slide valve stem movement by the presence of the recesses on the valve stem collars, and by the successful design of the slide valve stem movement screw gear.

All of the foregoing results in an essential simplification of the equipment, an increase in productivity, and a reduction in expense on manufacturing items by butt welding.

This invention is not to be confined to any strict conformity to the showings in the drawings but changes or modifications may be made therein so long as such changes or modifications mark no material departure from the spirit and scope of the appended claims.

What is claimed is:

1. An apparatus for adjusting the speed of feeding welded articles in butt welding by flashing, comprising a stationary clamp, a movable clamp, with the article to be welded mounted thereon, a hydraulic cylinder and piston means operably related to the movable clamp for shifting the movable clamp relative to the stationary clamp, a source of hydraulic fluid, conduit means between the source of hydraulic fluid and the cylinder, a slide valve assembly interposed in said conduit means for regulating the hydraulic fluid flow to and from said cylinder, a stem for said slide valve assembly, an adjustable electric drive operably connected to said stem, said electric drive including a reduction gear means for moving said stem for controlling fluid flow, and a power supply circuit for said adjustable electric drive employing a negative voltage feedback, with the arrangement being such that the speed of shifting of the movable clamp can be reduced by increasing the welding current above a pre-set value.

2. The apparatus as claimed in claim 1 in which the connection between the electric drive and stem includes an electromagnet, a casing for the electromagnet, said reduction gear means having a hollow screw with said casing being mounted on said screw, a rod passing through said hollow screw and having opposite ends, a yoke secured to one end of said rod and the other end of said rod abutting said stem.

3. The apparatus as claimed in claim 2 in which said stem is provided with axially spaced collars and said collars having recesses serving to decrease fluid flow upon the opening of the slide valve assembly.

References Cited

UNITED STATES PATENTS

| 2,727,969 | 12/1955 | Platte | 219—97 |
| 2,860,231 | 11/1958 | Stone | 219—97 |
| 3,204,078 | 8/1965 | Cavanagh | 219—97 |

RICHARD M. WOOD, *Primary Examiner.*

B. A. STEIN, *Assistant Examiner.*